(12) United States Patent
Kim

(10) Patent No.: US 9,334,630 B2
(45) Date of Patent: May 10, 2016

(54) ALL-ROUND HAZARD SENSING DEVICE FOR CONSTRUCTION APPARATUS

(75) Inventor: Young-Don Kim, Changwon-si (KR)

(73) Assignee: VOLVO CONSTRUCTION EQUIPMENT AB (SE)

( * ) Notice: Subject to any disclaimer, the term of this patent is extended or adjusted under 35 U.S.C. 154(b) by 29 days.

(21) Appl. No.: 14/364,251

(22) PCT Filed: Dec. 13, 2011

(86) PCT No.: PCT/KR2011/009565
§ 371 (c)(1),
(2), (4) Date: Jun. 10, 2014

(87) PCT Pub. No.: WO2013/089285
PCT Pub. Date: Jun. 20, 2013

(65) Prior Publication Data
US 2014/0343820 A1 Nov. 20, 2014

(51) Int. Cl.
*E02F 9/24* (2006.01)
*F02D 28/00* (2006.01)
*H04N 7/18* (2006.01)
*E02F 9/26* (2006.01)
*E02F 9/20* (2006.01)
*F16P 3/14* (2006.01)

(52) U.S. Cl.
CPC ............... *E02F 9/24* (2013.01); *E02F 9/2066* (2013.01); *E02F 9/262* (2013.01); *F02D 28/00* (2013.01); *F16P 3/142* (2013.01); *H04N 7/18* (2013.01)

(58) Field of Classification Search
CPC ...................................................... E02F 9/24
USPC ....................................................... 701/50, 99
See application file for complete search history.

(56) References Cited

U.S. PATENT DOCUMENTS

| 7,466,337 | B2 | 12/2008 | Sawada et al. |
| 2003/0085995 | A1 | 5/2003 | Sawada et al. |
| 2010/0220184 | A1* | 9/2010 | Appleyard ............ B21D 55/00 348/86 |

FOREIGN PATENT DOCUMENTS

| JP | H05331882 A | * 12/1993 |
| JP | 2002-371594 A | 12/2002 |
| JP | 2007-023486 A | 2/2007 |
| JP | 2008-101416 A | 5/2008 |
| JP | 2010-112100 A | 5/2010 |
| KR | 10-2011-0057554 A | 6/2011 |

OTHER PUBLICATIONS

International Search Report (in Korean and English) and Written Opinion (in Korean) for PCT/KR2011/009565, mailed Aug. 7, 2012; ISA/KR.

* cited by examiner

*Primary Examiner* — John Q Nguyen
*Assistant Examiner* — Anshul Sood
(74) *Attorney, Agent, or Firm* — Harness, Dickey & Pierce, P.L.C.

(57) ABSTRACT

An everywhere risk detection apparatus for construction equipment is disclosed, which includes an IECU generating and outputting a prevent signal to a VECU if a moving object in an image input from a camera is positioned within a set radius (or area) from the equipment, and generates and outputs the prevent signal to the VECU if a distance between the moving object in the image input from the camera and the equipment is shorter than a set distance. Accordingly, the equipment is compulsorily stopped regardless of an operator's equipment operation, and thus the occurrence of an accident is prevented.

1 Claim, 4 Drawing Sheets

ALL-ROUND HAZARD SENSING DEVICE FOR CONSTRUCTION APPARATUS

TECHNICAL FIELD

The present invention relates to an everywhere risk detection apparatus for construction machine. More particularly, the present invention relates to an everywhere risk detection apparatus for construction equipment, which can compulsorily stop the equipment to prevent the occurrence of an accident, regardless of an operator's equipment operation, if a moving object in images received from cameras attached to the equipment (e.g., excavator) is positioned within a set radius (or area) from the equipment or if a distance between the moving object in the images and the equipment is shorter than a set distance.

BACKGROUND ART

At present, an operator of an excavator is unable to sufficiently secure front/rear/left/right visual fields, and in particular, the operator may have a blind spot depending on the operator's visual field in front of the equipment or the position of an arm, a boom, or a bucket. Such a blind spot may cause the occurrence of an accident to involve loss of life and property damage.

As the related art technology, Korean Patent Application No. 10-2009-0114003 discloses construction equipment on which monitoring cameras provided with dual impact prevention devices are mounted. According to this technology, the surroundings of an excavator are observed using a plurality of cameras, and an operator can be notified of a risky situation. Since this technology is limited to notification of such a risky situation to the operator, and the operator is unable to actively cope with an emergency situation.

For reference, according to the related art technology, in the case of performing excavating work using the construction equipment such as the excavator in a state where the operator is in the blind spot, the operator can recognize the working environment in a risk area through image signals provided from the monitoring cameras mounted on an attachment, such as an arm to maximize the operator's visibility.

DISCLOSURE

Technical Problem

Therefore, the present invention has been made to solve the above-mentioned problems occurring in the related art, and one subject to be achieved by the present invention is to provide an everywhere risk detection apparatus for construction equipment, which can compulsorily stop the equipment to prevent the occurrence of an accident, regardless of an operator's equipment operation, by detecting motion surrounding the corresponding equipment through reading of images input from a plurality of cameras attached to the equipment (e.g., excavator).

Technical Solution

In accordance with an aspect of the present invention, an everywhere risk detection apparatus for construction equipment includes an IECU receiving an input of an image from a camera and generating a prevent signal; and a VECU including at least one of a first stop control means for generating a control signal for turning off an engine start and outputting the control signal to an engine start on/off means when the prevent signal is input from the IECU and a second stop control means for generating a control signal for compulsorily intercepting a flow of hydraulic fluid and outputting the control signal to a hydraulic interception means when the prevent signal is input from the IECU, wherein the IECU includes at least one of a first signal generation means for generating and outputting the prevent signal to the VECU if a moving object in the image input from the camera is positioned within a set radius (or area) from the equipment and a second signal generation means for generating and outputting the prevent signal to the VECU if a distance between the moving object in the image input from the camera and the equipment is shorter than a set distance.

Preferably, the first stop control means or the second stop control means generates the control signal only in the case where a speed of the equipment is determined to be lower than a set speed, and a case where the speed of the equipment is lower than the set speed corresponds to any one of a case where a discharge hydraulic flow rate is lower than a set flow rate, a case where an angle of a joystick is smaller than a set angle, a case where a position value of a forward/backward pedal is smaller than a set position value, and a case where an input RPM value is smaller than a set value.

Advantageous Effect

According to the everywhere risk detection apparatus for construction equipment according to the present invention, if a moving object in images received from cameras attached to the equipment (e.g., excavator) is positioned within a set radius (or area) from the equipment or if a distance between the moving object in the images and the equipment is shorter than a set distance, the corresponding equipment can be compulsorily stopped regardless of an operator's equipment operation, and thus the occurrence of an accident can be prevented.

That is, since the equipment operation is compulsorily stopped regardless of the operator's equipment operation through active determination of an accident due to the moving object that makes a sudden rush to the equipment during the equipment operation, the occurrence of an accident due to the operator's erroneous operation can be prevented.

Further, since the corresponding equipment is compulsorily stopped only in the case where it is determined that the speed of the corresponding equipment is lower than the set speed (i.e., the equipment is operated at low speed that is lower than the set speed), it additionally becomes possible to prevent the turnover of the corresponding equipment due to the compulsory stopping operation.

BRIEF DESCRIPTION OF THE DRAWINGS

The above objects, other features and advantages of the present invention will become more apparent by describing the preferred embodiments thereof with reference to the accompanying drawings, in which.

DESCRIPTION OF REFERENCE NUMERALS IN THE DRAWING

Figure 1:
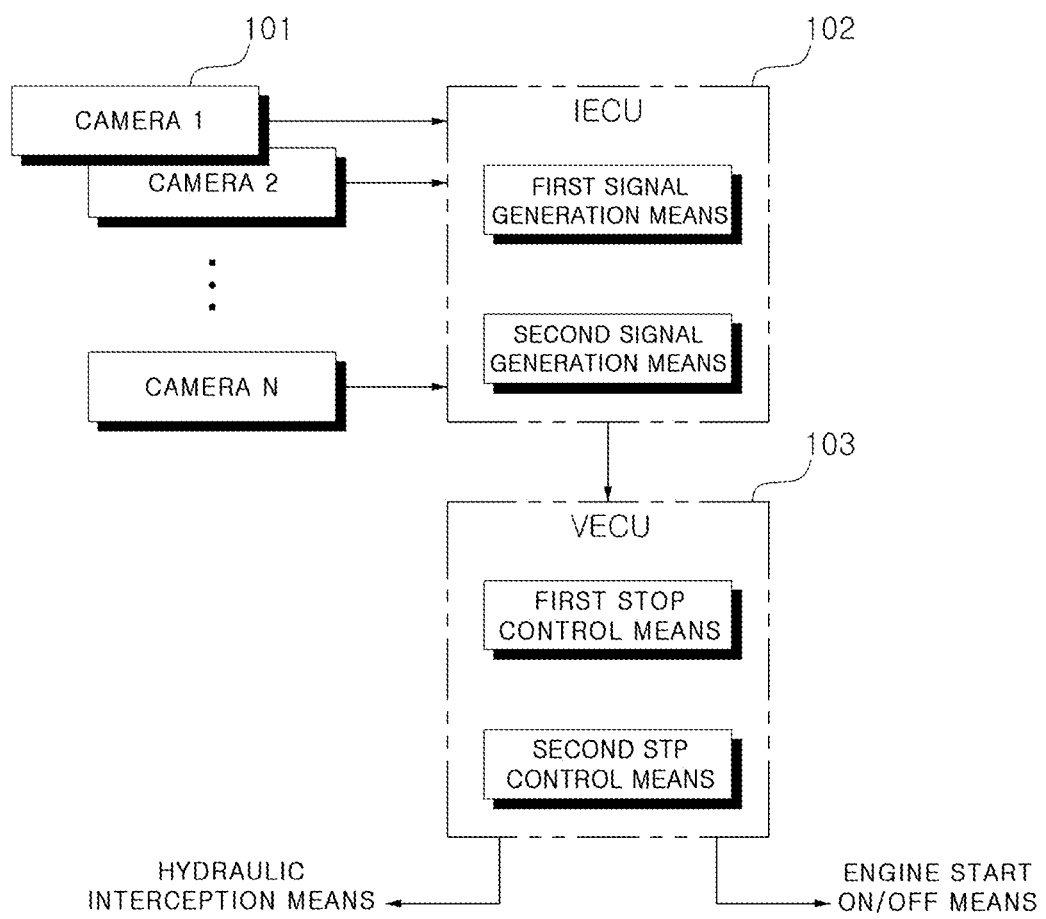
FIG. 1 is a block diagram illustrating the configuration of an everywhere risk detection apparatus for construction equipment according to an embodiment of the present invention.

101: camera
102: IECU
103: VECU

BEST MODE

Hereinafter, preferred embodiments of the present invention will be described in detail with reference to the accompanying drawings.

The matters defined in the description, such as the detailed construction and elements, are nothing but specific details provided to assist those of ordinary skill in the art in a comprehensive understanding of the invention, and the present invention is not limited to the embodiments disclosed hereinafter.

For clarity in explaining the present invention, potions that are not related to the description are omitted, and in the entire description of the present invention, the same drawing reference numerals are used for the same elements across various figures.

In the entire description and claims, the term "includes" and/or "comprises" means that one or more other components, steps, operation and/or existence or addition of elements are not excluded in addition to the described components, steps, operation and/or elements.

FIG. 1 is a block diagram illustrating the configuration of an everywhere risk detection apparatus for construction equipment according to an embodiment of the present invention.

As illustrated in FIG. 1, an everywhere risk detection apparatus for construction equipment according to an embodiment of the present invention is configured so that if a moving object in images received from cameras attached to the equipment (e.g., excavator) is positioned within a set radius (or area) from the equipment or if a distance between the moving object in the images and the equipment is shorter than a set distance, the apparatus compulsorily stops the corresponding equipment regardless of an operator's equipment operation.

Specifically, the everywhere risk detection apparatus includes a plurality of cameras 101 attached to the construction equipment, an IECU 102 including at least one of a first signal generation means and a second signal generation means, and a VECU 103 including at least one of a first stop control means and a second stop control means.

That is, the everywhere risk detection apparatus for construction equipment includes a plurality of cameras 101; an IECU 102 receiving an input of an image from the plurality of cameras 101 and generating a prevent signal according to a set condition; and a VECU 103 including at least one of a first stop control means for generating a control signal for turning off an engine start and outputting the control signal to an engine start on/off means when the prevent signal is input from the IECU 102 and a second stop control means for generating a control signal for compulsorily intercepting a flow of hydraulic fluid and outputting the control signal to a hydraulic interception means when the prevent signal is input from the IECU 102, wherein the IECU 102 includes at least one of a first signal generation means for generating and outputting the prevent signal to the VECU 103 if a moving object in the images input from the cameras 101 is positioned within a set radius (or area) from the equipment and a second signal generation means for generating and outputting the prevent signal to the VECU 103 if a distance between the moving object in the images input from the cameras 101 and the equipment is shorter than a set distance.

Here, the IECU 102 includes at least one of the first signal generation means and the second signal generation means. The first signal generation means extracts a moving object in the images through reading of the images input from the plurality of cameras 101 attached to the construction equipment (e.g., excavator) according to a predetermined algorithm, and generates and outputs the prevent signal to the VECU 103 if the moving object extracted from the images is positioned within the set radius (or area) from the equipment. The second signal generation means extracts the moving object in the images through reading of the images input from the plurality of cameras 101 attached to the construction equipment (e.g., excavator) according to a predetermined algorithm, and generates and outputs the prevent signal to the VECU 103 if the distance between the moving object extracted from the images and the corresponding equipment is shorter than the set distance.

The VECU 103 operates to compulsorily stop the corresponding equipment regardless of the operator's equipment operation if the moving object in the images input from the cameras 101 attached to the construction equipment (e.g., excavator) is positioned within the set radius (or area) from the equipment or if the distance between the moving object in the images and the corresponding equipment is shorter than the set distance through the IECU 102.

For this, the VECU 103 includes the first stop control means and the second stop control means.

If the prevent signal is input from the IECU 102, the first stop control means generates a control signal for turning off the engine start and outputs the generated control signal to the engine start on/off means. In accordance with the output control signal, the engine start is turned off and thus the corresponding equipment is stopped.

If the prevent signal is input from the IECU 102, the second stop control means generates a control signal for compulsorily intercept a flow of hydraulic fluid and outputs the generated control signal to the hydraulic interception means (e.g., means for intercepting pilot pressure or valve opening/closing means through which the hydraulic fluid flows). In accordance with the output control signal, the flow of the hydraulic fluid is compulsorily intercepted.

In addition, in order to prevent the turnover of the corresponding equipment during operation, the first stop control means or the second stop control means generates the control signal only in the case where the speed of the equipment is determined to be lower than a set speed.

A case where the speed of the equipment is lower than the set speed corresponds to any one of a case where a discharge hydraulic flow rate is lower than a set flow rate, a case where an angle of a joystick is smaller than a set angle, a case where a position value of a forward/backward pedal is smaller than a set position value, and a case where an input RPM value is smaller than a set value.

Hereinafter, the operation of an everywhere risk detection apparatus for construction equipment according to an embodiment of the present invention will be described with reference to FIGS. 2 and 3.

Figure 2:
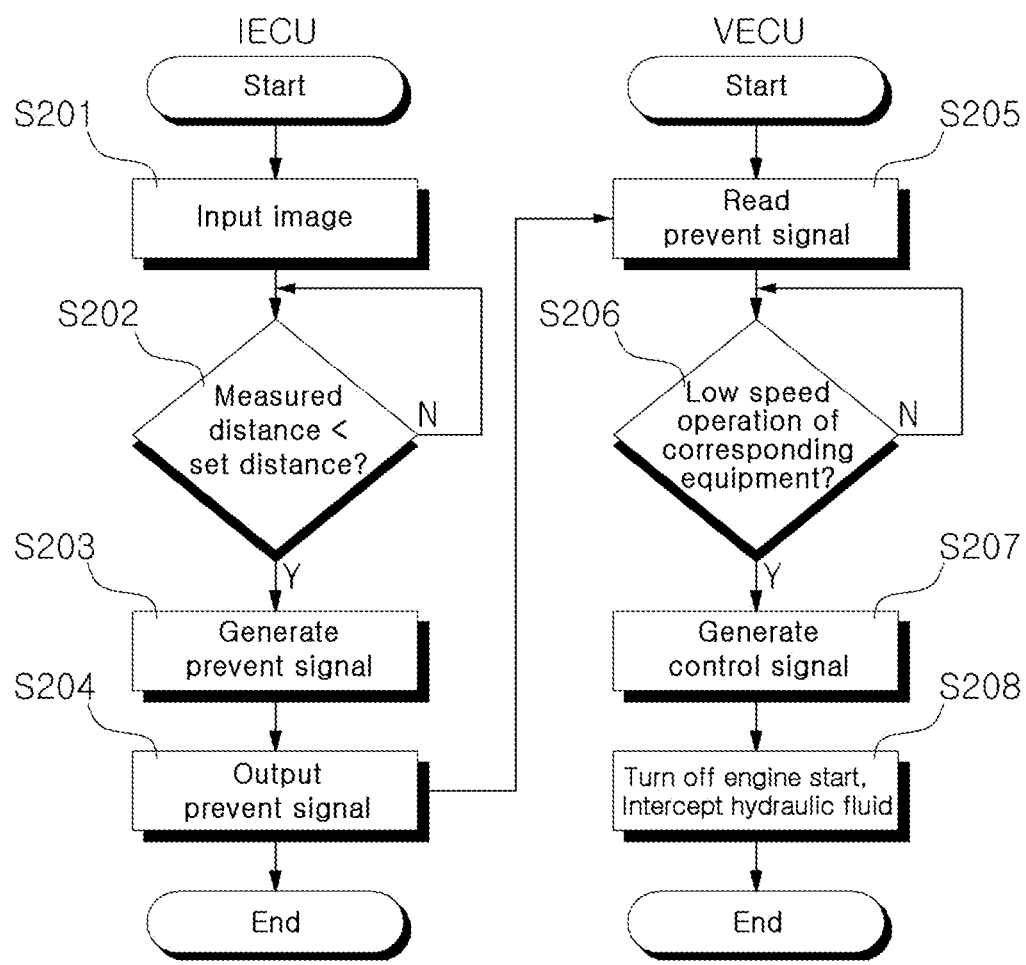
FIG. 2 is a flowchart illustrating in order the operation of an everywhere risk detection apparatus for construction equipment according to an embodiment of the present invention.
Figure 3:
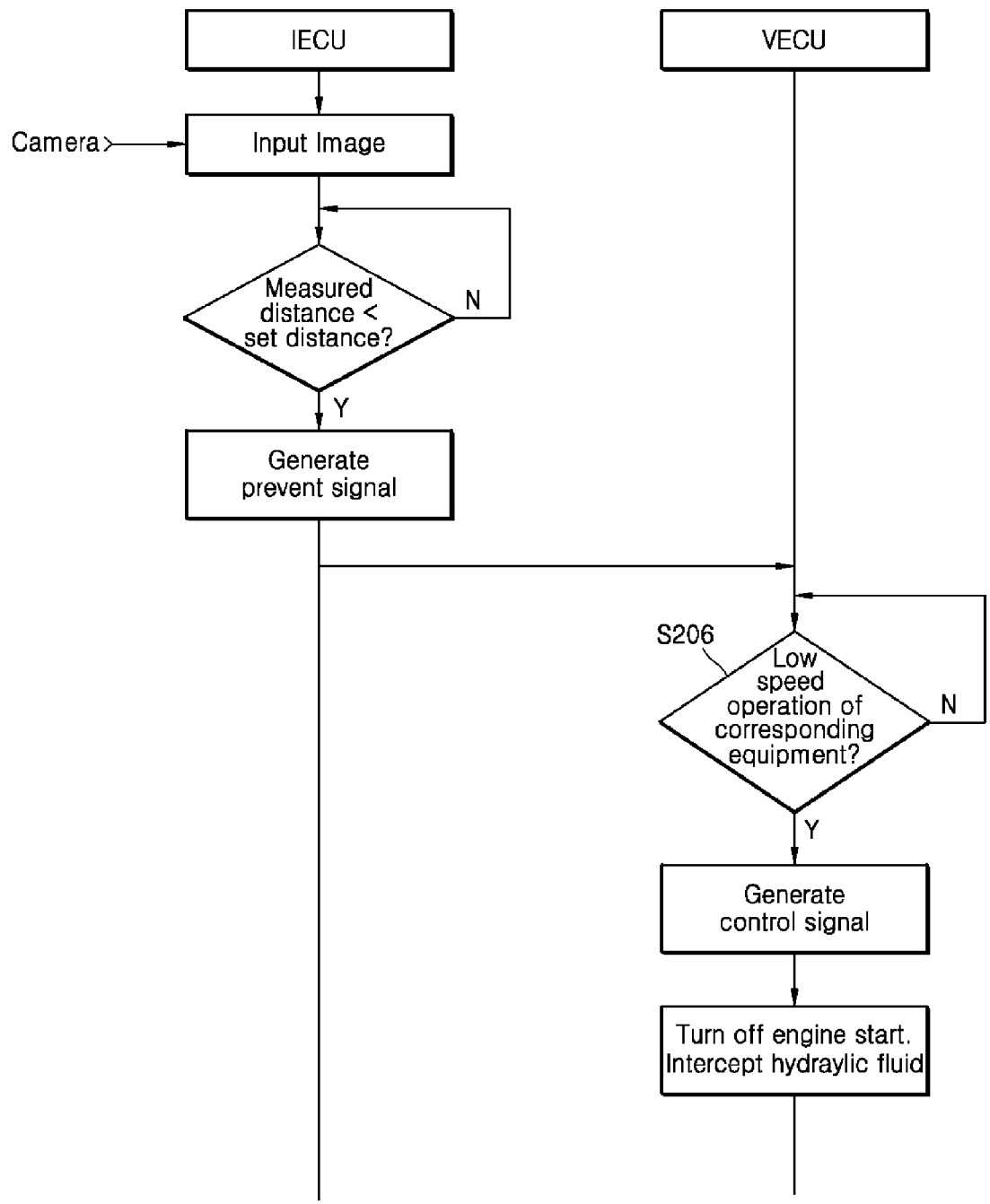
FIG. 3 is a procedural flowchart illustrating in order the operation of an everywhere risk detection apparatus for construction equipment according to an embodiment of the present invention.

FIG. 2 is a flowchart illustrating in order the operation of an everywhere risk detection apparatus for construction equipment according to an embodiment of the present invention, and FIG. 3 is a procedural flowchart illustrating in order the operation of an everywhere risk detection apparatus for construction equipment according to an embodiment of the present invention.

As illustrated in FIGS. 2 and 3, according to an embodiment of the present invention, it is determined if the moving object in the images input from the cameras 101 attached to the construction equipment (e.g., excavator) is positioned within the set radius (or area) from the equipment or if the distance between the moving object in the images and the corresponding equipment is shorter than the set distance, and according to the results of the determination, the prevent signal is generated and output to the VECU 103 (S201 to S204).

The details thereof are as follows.

1. First, the IECU 102 receives an input of images from the plurality of cameras attached to the construction equipment (e.g., excavator).

Then, the images input from the plurality of cameras are read according to a predetermined algorithm.

Next, if there is a moving object in the input image, the moving object is extracted.

Then, it is determined whether the moving object extracted from the images is positioned within the set radium (or area) from the corresponding equipment.

If the moving object extracted from the image is positioned within the set radium (or area) from the corresponding equipment as the result of the determination, the prevent signal is generated and output to the VECU 103.

2. The IECU 102 receives an input of images from the plurality of cameras attached to the construction equipment (e.g., excavator).

Then, the images input from the plurality of cameras are read according to a predetermined algorithm.

Next, if there is a moving object in the input image, the moving object is extracted.

Then, it is determined whether the distance between the moving object in the images and the corresponding equipment is shorter than the set distance.

If the distance between the moving object in the images and the corresponding equipment is shorter than the set distance as the result of the determination, the prevent signal is generated and output to the VECU 103.

That is, the IECU 102 extracts the moving object in the images through reading of the images input from the plurality of cameras attached to the construction equipment (e.g., excavator) according to the predetermined algorithm, and generates and outputs the prevent signal to the VECU 103 if the moving object extracted from the images is positioned within the set radius (or area) from the equipment. Further, the IECU 102 extracts the moving object in the images through reading of the images input from the plurality of cameras 101 attached to the construction equipment (e.g., excavator) according to the predetermined algorithm, and generates and outputs the prevent signal to the VECU 103 if the distance between the moving object extracted from the images and the corresponding equipment is shorter than the set distance.

Next, the VECU 103 operates to compulsorily stop the corresponding equipment regardless of the operator's equipment operation if the moving object in the images input from the camera attached to the construction equipment (e.g., excavator) is positioned within the set radius (or area) from the equipment or if the distance between the moving object in the images and the corresponding equipment is shorter than the set distance through the IECU 102 (S205 to S208).

The details thereof are as follows.

If the prevent signal is input from the IECU 102 (i.e., risky situation is sensed), the VECU 103 generates a control signal for turning off the engine start and outputs the generated control signal to the engine start on/off means. In accordance with the output control signal, the engine start is turned off and thus the corresponding equipment is stopped.

Further, if the prevent signal is input from the IECU 102, the VECU 103 generates a control signal for compulsorily intercept a flow of hydraulic fluid and outputs the generated control signal to the hydraulic interception means. In accordance with the output control signal, the flow of the hydraulic fluid is compulsorily intercepted.

The hydraulic interception means may be, for example, means for intercepting pilot pressure or valve opening/closing means through which the hydraulic fluid flows.

In addition, in order to prevent the turnover of the corresponding equipment during operation, the VECU 103 generates the control signal only in the case where the speed of the equipment is determined to be lower than a set speed (i.e., in the case where the equipment is operated at low speed that is lower than the set speed).

For this, a control signal for stopping the equipment is generated to prevent the turnover of the corresponding equipment in the case where the speed of the equipment is lower than the set speed. The case where the speed of the equipment is lower than the set speed corresponds to any one of a case where a discharge hydraulic flow rate is lower than a set flow rate, a case where an angle of a joystick is smaller than a set angle, a case where a position value of a forward/backward pedal is smaller than a set position value, and a case where an input RPM value is smaller than a set value.

According to the present invention as described above, if the moving object in the images received from the cameras attached to the equipment (e.g., excavator) is positioned within the set radius (or area) from the equipment or if the distance between the moving object in the images and the equipment is shorter than the set distance, the corresponding equipment can be compulsorily stopped regardless of an operator's equipment operation, and thus the occurrence of an accident can be prevented.

That is, since the equipment operation is compulsorily stopped regardless of the operator's equipment operation through active determination of an accident due to the moving object that makes a sudden rush to the equipment during the equipment operation, the occurrence of an accident due to the operator's erroneous operation can be prevented.

Figure 4:
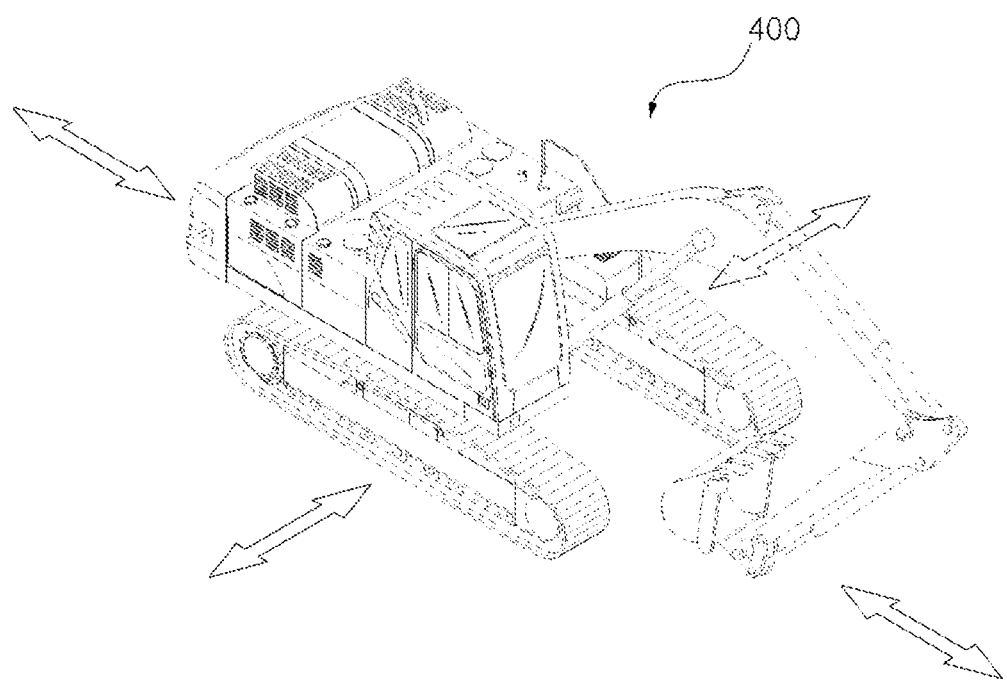
FIG. 4 is a view explaining a use state of an everywhere risk detection apparatus for construction equipment according to an embodiment of the present invention.

FIG. 4 is a view explaining a use state of an everywhere risk detection apparatus for construction equipment according to an embodiment of the present invention.

As shown in FIG. 4, the operator of the construction equipment (e.g., excavator) is unable to sufficiently secure front/rear/left/right visual fields, and in particular, the operator may have a blind spot depending on the operator's visual field in front of the equipment or the position of the arm, boom, or bucket.

In order to solve this, according to the present invention, if the moving object in the images received from the cameras attached to everywhere of the equipment (e.g., excavator) 400 is positioned within the set radius (or area) from the equipment or if the distance between the moving object in the images and the equipment is shorter than the set distance, the corresponding equipment is compulsorily stopped regardless of the operator's equipment operation, and thus the occurrence of an accident can be prevented.

The positions of the plurality of cameras may be variously modified within the technical concept of the present invention.

INDUSTRIAL APPLICABILITY

As apparent from the above description, according to the everywhere risk detection apparatus for construction equipment according to the embodiments of the present invention, if the moving object in the images received from the cameras attached to everywhere of the equipment (e.g., excavator) is positioned within the set radius (or area) from the equipment or if the distance between the moving object in the images and the equipment is shorter than the set distance, the corresponding equipment is compulsorily stopped regardless of the operator's equipment operation, and thus the occurrence of an accident can be prevented.

The invention claimed is:

1. An everywhere risk detection apparatus for construction equipment comprising:
   an instrumental electronic control unit (IECU) receiving an input of an image from a camera and generating a prevent signal; and
   a vehicle electronic control unit (VECU) including at least one of a first stop controller for generating a control signal for turning off an engine and outputting the control signal to an engine start on/off device when the prevent signal is input from the IECU and a second stop controller for generating a control signal for compulsorily intercepting a flow of hydraulic fluid and outputting the control signal to a hydraulic interception device when the prevent signal is input from the IECU,
   wherein the IECU includes at least one of a first signal generator for generating and outputting the prevent signal to the VECU if a moving object in the image input from the camera is positioned within a set radius (or area) from the equipment and a second signal generator for generating and outputting the prevent signal to the VECU if a distance between the moving object in the image input from the camera and the equipment is shorter than a set distance;
   wherein the first stop controller or the second stop controller generates the control signal only in the case where a speed of the equipment is determined to be lower than a set speed, and a case where the speed of the equipment is lower than the set speed corresponds to any one of a case where a discharge hydraulic flow rate is lower than a set flow rate, a case where an angle of a joystick is smaller than a set angle, a case where a position value of a forward/backward pedal is smaller than a set position value, and a case where an input revolutions per minute (RPM) value is smaller than a set value.

* * * * *